(12) United States Patent
Raghunath et al.

(10) Patent No.: US 11,089,099 B2
(45) Date of Patent: Aug. 10, 2021

(54) TECHNOLOGIES FOR MANAGING DATA OBJECT REQUESTS IN A STORAGE NODE CLUSTER

(71) Applicant: Intel Corporation, Santa Clara, CA (US)

(72) Inventors: Arun Raghunath, Portland, OR (US); Michael Mesnier, Scappoose, OR (US); Paul Brett, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 14/866,892

(22) Filed: Sep. 26, 2015

(65) Prior Publication Data
US 2017/0093975 A1 Mar. 30, 2017

(51) Int. Cl.
*H04L 29/08* (2006.01)

(52) U.S. Cl.
CPC .......... *H04L 67/1097* (2013.01); *H04L 67/28* (2013.01)

(58) Field of Classification Search
CPC . H04L 67/1097; H04L 67/28; H04L 43/0852; H04L 51/14; H04L 67/10; H04L 67/1008; G06Q 10/06; G06Q 10/0631; G06F 17/30209; G06F 17/30581; G06F 17/30598; G06F 17/30657; G06F 17/30864
See application file for complete search history.

(56) References Cited

U.S. PATENT DOCUMENTS

| | | | | |
|---|---|---|---|---|
| 8,145,736 | B1 * | 3/2012 | Tewari | G06F 16/1834 709/223 |
| 8,595,385 | B1 * | 11/2013 | Shapiro | G06F 13/385 709/253 |
| 9,112,890 | B1 * | 8/2015 | Oh | G06F 3/06 |

(Continued)

FOREIGN PATENT DOCUMENTS

WO    2013-184935    12/2013

OTHER PUBLICATIONS

International Search Report for PCT/US16/048849, dated Nov. 30, 2016 (3 pages).

(Continued)

*Primary Examiner* — Jason D Recek
*Assistant Examiner* — Ranjan Pant
(74) *Attorney, Agent, or Firm* — Compass IP Law PC

(57) ABSTRACT

Technologies for managing data object requests in a storage node cluster include a proxy computing node communicatively coupled to the cluster of storage nodes. The proxy computing node is configured to receive data object requests from a communicatively coupled client computing device and identify a plurality of storage nodes of the cluster at which the data object of the data object request is stored. The proxy computing node is further configured to determine which of the identified storage nodes from which to retrieve the stored data object and transmit a request for the data object. Additionally, the proxy computing node is configured to estimate a request completion time based on a service time and a wait time for each of the identified storage nodes, as well as identify which of the storage nodes to retrieve the stored data object from based on the estimated request completion times. Other embodiments are described and claimed.

20 Claims, 9 Drawing Sheets

(56) References Cited

U.S. PATENT DOCUMENTS

| | | | | |
|---|---|---|---|---|
| 9,990,260 | B2* | 6/2018 | Pandit | G06F 11/2069 |
| 10,503,654 | B2* | 12/2019 | Raghunath | G06F 11/1076 |
| 2004/0006562 | A1* | 1/2004 | Wagner | G06F 16/93 |
| 2006/0112247 | A1* | 5/2006 | Ramany | G06F 3/0605 |
| | | | | 711/165 |
| 2006/0168147 | A1* | 7/2006 | Inoue | A63F 13/12 |
| | | | | 709/219 |
| 2007/0150322 | A1* | 6/2007 | Falchuk | H04L 12/66 |
| | | | | 709/200 |
| 2007/0282979 | A1* | 12/2007 | Tuel | G06F 9/5033 |
| | | | | 709/219 |
| 2008/0222142 | A1* | 9/2008 | O'Donnell | G06F 16/24575 |
| 2009/0234805 | A1 | 9/2009 | Golwalkar | |
| 2010/0332532 | A1 | 12/2010 | Joshi | |
| 2012/0166394 | A1* | 6/2012 | Kim | G06F 16/184 |
| | | | | 707/634 |
| 2012/0166611 | A1 | 6/2012 | Kim | |
| 2012/0284229 | A1* | 11/2012 | Kim | H04L 67/1095 |
| | | | | 707/634 |
| 2013/0227111 | A1* | 8/2013 | Wright | G06F 9/5083 |
| | | | | 709/223 |
| 2014/0089735 | A1* | 3/2014 | Barrett | G06F 11/3495 |
| | | | | 714/27 |
| 2014/0119221 | A1* | 5/2014 | Park | H04L 43/16 |
| | | | | 370/252 |
| 2014/0156713 | A1* | 6/2014 | Bandic | G06F 16/1844 |
| | | | | 707/827 |
| 2014/0330802 | A1* | 11/2014 | Preslan | H04L 67/1097 |
| | | | | 707/704 |
| 2014/0379921 | A1* | 12/2014 | Morley | H04L 67/10 |
| | | | | 709/226 |
| 2015/0043347 | A1* | 2/2015 | Ng | H04M 15/8016 |
| | | | | 370/235 |
| 2015/0127611 | A1* | 5/2015 | Westerman | G06F 16/128 |
| | | | | 707/639 |
| 2015/0134825 | A1* | 5/2015 | Alshinnawi | H04L 43/08 |
| | | | | 709/226 |
| 2015/0149663 | A1* | 5/2015 | Weihs | G06F 11/3034 |
| | | | | 710/18 |
| 2015/0199388 | A1* | 7/2015 | Hrischuk | G06F 16/21 |
| | | | | 707/802 |
| 2015/0268868 | A1* | 9/2015 | Li-On | G06F 11/2221 |
| | | | | 710/74 |
| 2015/0293830 | A1* | 10/2015 | Bhide | G06F 9/45533 |
| | | | | 718/1 |
| 2016/0085462 | A1* | 3/2016 | Buzzard | G06F 3/067 |
| | | | | 711/162 |
| 2016/0170823 | A1* | 6/2016 | Miller | G06F 3/067 |
| | | | | 714/56 |
| 2016/0378846 | A1* | 12/2016 | Luse | G06F 17/30082 |
| | | | | 707/740 |
| 2019/0065262 | A1* | 2/2019 | Yoshida | G06F 9/4843 |

OTHER PUBLICATIONS

Written Opinion for PCT/US16/048849, dated Nov. 30, 2016 (4 pages).

Borthakur, Dhruba, "The Hadoop Distributed File System: Architecture and Design", Copyright © 2005 The Apache Software Foundation, 12 pages.

Saharia, Matei, et. al., "Spark: Cluster Computing with Working Sets", University of California, Berkeley, 2010 Publication, 7 pages.

Weil, Sage A., et al., "Ceph: A Scalable, High-Performance Distributed File System", University of California, Santa Cruz, 2006 Publication, 14 pages.

* cited by examiner

TECHNOLOGIES FOR MANAGING DATA OBJECT REQUESTS IN A STORAGE NODE CLUSTER

BACKGROUND

Distributed data object storage clusters typically utilize a plurality of storage nodes (i.e., computing devices capable of storing a plurality of data objects) to provide enhanced performance and availability. Such storage clusters can be used for data object replication (i.e., data object redundancy/backup), for example. Generally, the storage clusters are not visible to a client computing device that is either transmitting data objects to be stored on the storage nodes or receiving stored data objects from the storage nodes. Accordingly, incoming requests (e.g., network packets including data objects or data object requests) are typically queued at an entry point of the storage cluster, commonly referred to as a proxy (e.g., a proxy server). As such, the proxy may be a computing device that is configured to act as an intermediary for the incoming client requests. Additionally, the proxy computing node can be configured to select which storage node to retrieve the requested data object from.

However, conventional proxy computing nodes treat all of the storage nodes the same and attempt to distribute the requests evenly across the storage nodes, despite each of the storage nodes generally having different capabilities (e.g., processor capabilities, memory capacity, disk type, configurations, bandwidth, etc.). As a result, for example, storage nodes with a higher capacity can end up receiving more requests when traditional request distribution techniques are used (e.g., random selection of one of the storage nodes, round-robin across chosen storage nodes, etc.). Such request distribution may lead to a performance bottleneck and/or leave other storage nodes underutilized or in an idle state.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
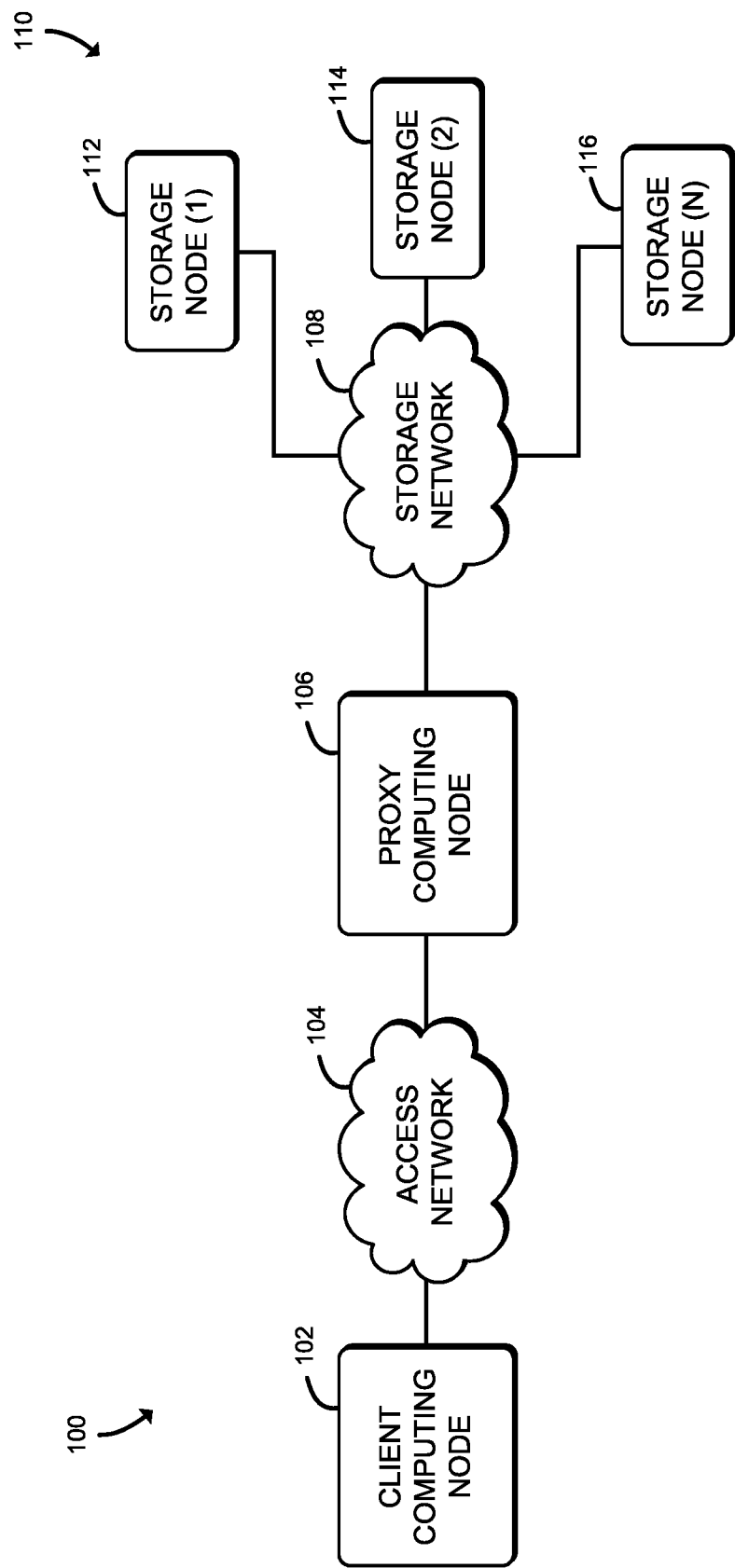
FIG. 1 is a simplified block diagram of at least one embodiment of a system for managing data object requests that includes a proxy computing node communicatively coupled to a storage node cluster.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing data object requests includes a client computing node 102 communicatively coupled to a proxy computing node 106 via an access network 104. As shown, the proxy computing node 106 is further communicatively coupled to a cluster of storage nodes 110 via a storage network 108. As will be described in further detail below, the storage nodes 110 includes a plurality of storage nodes (see, e.g., storage node (1) 112, storage node (2) 114, and storage node (n) 116) capable of storing data objects (e.g., replicas of the data objects for providing redundant backup) amongst two or more of the storage nodes 110.

In use, the client computing node 102 transmits a network packet (i.e., via the access network 104) to the proxy computing node 106. The network packet includes a request for a data object to be retrieved from one of the storage nodes 110. Upon having received the network packet (i.e., the data object request), the proxy computing node 106 determines which of the storage nodes 110 to retrieve the requested data object from based on an estimated request completion time (i.e., an estimated latency) determined for each of the storage nodes.

To determine the estimated request completion time, the proxy computing node 106 determines a service time and a wait time. The service time represents an estimated amount of time to retrieve the requested data object. The service time can be estimated prior to receiving the data object request from the client computing node 102 and updated subsequent to receiving the data object from one of the storage nodes 110. In some embodiments, the service time may be stored at a table (i.e., a service time table). In such embodiments, the service time table may include a different service time determined for each size range of a plurality of predetermined size ranges (e.g., size ranges for the data objects which the storage nodes 110 typically store).

Additionally, as will be described in further detail below, the service time table may be initially populated based on retrieved test data objects sized within each size range that are stored at each of the storage nodes 110. The wait time represents an estimated amount of time corresponding to a present queue of previously transmitted data object requests (i.e., outstanding data object requests queue) for a particular one of the storage nodes 110. It should be appreciate that, in some embodiments, the service times and/or wait times may be based on various models as a result of applying one or more modelling technologies, such as machine learning algorithms, prediction analysis, statistical analysis, and/or telemetry analysis.

The estimated request completion time is determined as a function of a service time for a particular one of the storage nodes 110 based on a size of the data object corresponding to the data object request and a wait time corresponding to that outstanding data object request queue of that particular one of the storage nodes 110. Accordingly, in the illustrative embodiment, the proxy computing node 106 is configured to retrieve the data object from whichever of the storage nodes 110 has the lowest (i.e., shortest in duration) estimated request completion time.

Each of the access network 104 and the storage network 108 may be embodied as any type of wired and/or wireless communication network, including cellular networks, such as Global System for Mobile Communications (GSM) or Long-Term Evolution (LTE), telephony networks, digital subscriber line (DSL) networks, cable networks, local or wide area networks (LANs/WANs), global networks (e.g., the Internet), or any combination thereof. It should be appreciated that the access network 104 and/or the storage network 108 may serve as a centralized network and, in some embodiments, may be communicatively coupled to another network (e.g., the Internet). Accordingly, the access network 104 and/or the storage network 108 may include a variety of network devices (not shown), virtual and physical, such as routers, switches, network hubs, servers, storage devices, compute devices, etc., as needed to facilitate communication between the client computing node 102 and the proxy computing node 106 via the access network 104, as well as between the proxy computing node 106 and the cluster of storage nodes 110 via the storage network 108.

Figure 2:
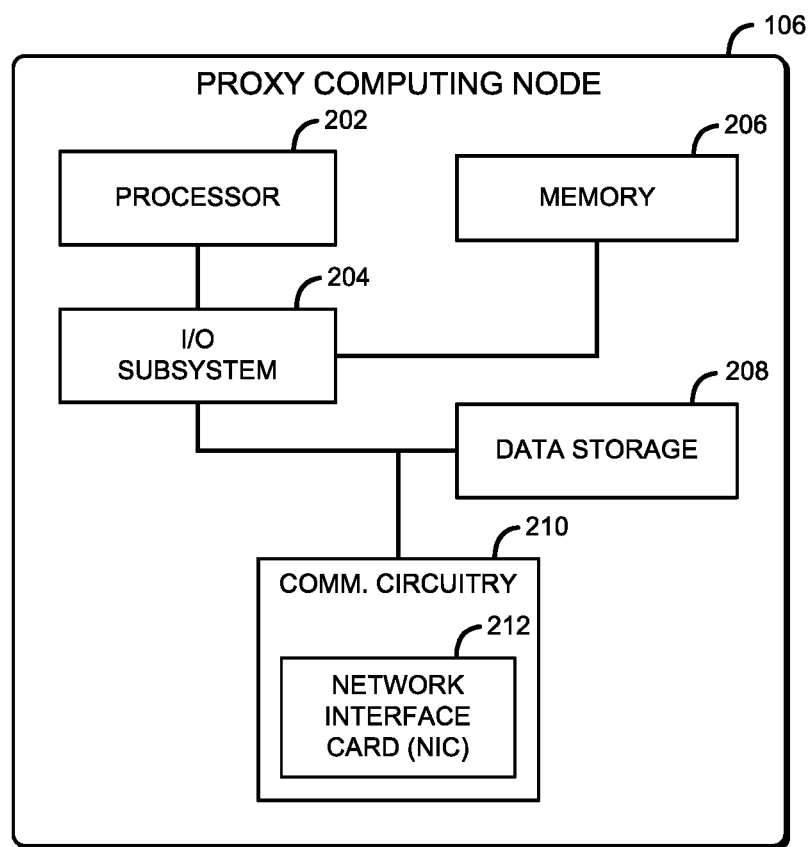
FIG. 2 is a simplified block diagram of at least one embodiment of the proxy computing node of the system of FIG. 1.

The proxy computing node 106 may be embodied as any type of computing device that is capable of performing the functions described herein, such as, without limitation, a rack-mounted switch, a standalone switch, a fully managed switch, a partially managed switch, a full-duplex and/or half-duplex communication mode enabled switch, etc. As shown in FIG. 2, the illustrative proxy computing node 106 includes a processor 202, an input/output (I/O) subsystem 204, a memory 206, a data storage device 208, and communication circuitry 210. Of course, the proxy computing node 106 may include other or additional components, such as those commonly found in a computing device (e.g., one or more input/output peripheral devices), in other embodiments. Additionally, in some embodiments, one or more of the illustrative components may be incorporated in, or otherwise form a portion of, another component. For example, the memory 206, or portions thereof, may be incorporated in the processor 202 in some embodiments. Further, in some embodiments, one or more of the illustrative components may be omitted from the proxy computing node 106.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the proxy computing node 106, such as operating systems, applications, programs, libraries, and drivers. The memory 206 is communicatively coupled to the processor 202 via the I/O subsystem 204, which may be embodied as circuitry and/or components to facilitate input/output operations with the processor 202, the memory 206, and other components of the proxy computing node 106. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the proxy computing node 106, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. It should be appreciated that the data storage device 208 and/or the memory 206 (e.g., the computer-readable storage media) may store various data as described herein, including operating systems, applications, programs, libraries, drivers, instructions, etc., capable of being executed by a processor (e.g., the processor 202) of the proxy computing node 106.

The communication circuitry 210 may be embodied as any communication circuit, device, or collection thereof, capable of enabling communications between the proxy computing node 106 and other computing devices (e.g., the client computing node 102, the storage nodes 110, etc.) over a network (e.g., the access network 104 and/or the storage network 108). The communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 210 includes a network interface controller (NIC) 212. The NIC 212 may be embodied as one or more add-in-boards, daughtercards, network interface cards, controller chips, chipsets, or other devices that may be used by the proxy computing node 106. For example, in some embodiments, the NIC 212 may be integrated with the processor 202, embodied as an expansion card coupled to the I/O subsystem 204 over an expansion bus (e.g., PCI Express), part of an SoC that includes one or more processors, or included on a multichip package that also contains one or more processors.

Alternatively, in some embodiments, the NIC 212 may include a local processor (not shown) and/or a local memory (not shown) that are both local to the NIC 212. In such embodiments, the local processor of the NIC 212 may be capable of performing the offloaded functions (e.g., replication, network packet processing, etc.) as described herein. Additionally or alternatively, in such embodiments, the local memory of the NIC 212 may be capable of storing data local to the NIC 212. Additionally or alternatively, in some embodiments, functionality of the NIC 212 may be integrated into one or more components of the proxy computing node 106 at the board level, socket level, chip level, and/or other levels.

Referring again to FIG. 1, the client computing node 102 may be embodied as any type of computation or computing device capable of performing the functions described herein, including, without limitation, a computer, a mobile computing device (e.g., smartphone, tablet, laptop, notebook, wearable, etc.), a server (e.g., stand-alone, rack-mounted, blade, etc.), a network appliance (e.g., physical or virtual), a web appliance, a distributed computing system, a processor-based system, and/or a multiprocessor system. Similar to the illustrative proxy computing node 106 of FIG. 2, the client computing node 102 may include a processor, an I/O subsystem, a memory, a data storage device, and/or communication circuitry, which are not shown for clarity of the description. As such, further descriptions of the like components are not repeated herein with the understanding that the description of the corresponding components provided above in regard to the proxy computing node 106 applies equally to the corresponding components of the client computing node 102.

The illustrative cluster of storage nodes 110 includes a first storage node, which is designated as storage node (1) 112, a second storage node, which is designated as storage node (2) 114, and a third storage node, which is designated as storage node (N) 116 (i.e., the "Nth" storage node of the cluster of storage nodes 110, wherein "N" is a positive integer and designates one or more additional storage nodes). Each of the storage nodes 110 may be embodied as any type of storage device capable of performing the functions described herein, including, without limitation, a server (e.g., stand-alone, rack-mounted, blade, etc.), a network appliance (e.g., physical or virtual), a high-performance computing device, a web appliance, a distributed computing system, a computer, a processor-based system, and/or a multiprocessor system. As such, similar to the illustrative proxy computing node 106 of FIG. 2, each of the storage nodes 110 may include a processor, an I/O subsystem, a memory, a data storage device, and/or communication circuitry, which are not shown for clarity of the description. Accordingly, further descriptions of the like components are not repeated herein with the understanding that the description of the corresponding components provided above in regard to the proxy computing node 106 applies equally to the corresponding components of each of the storage nodes 110.

Figure 3:
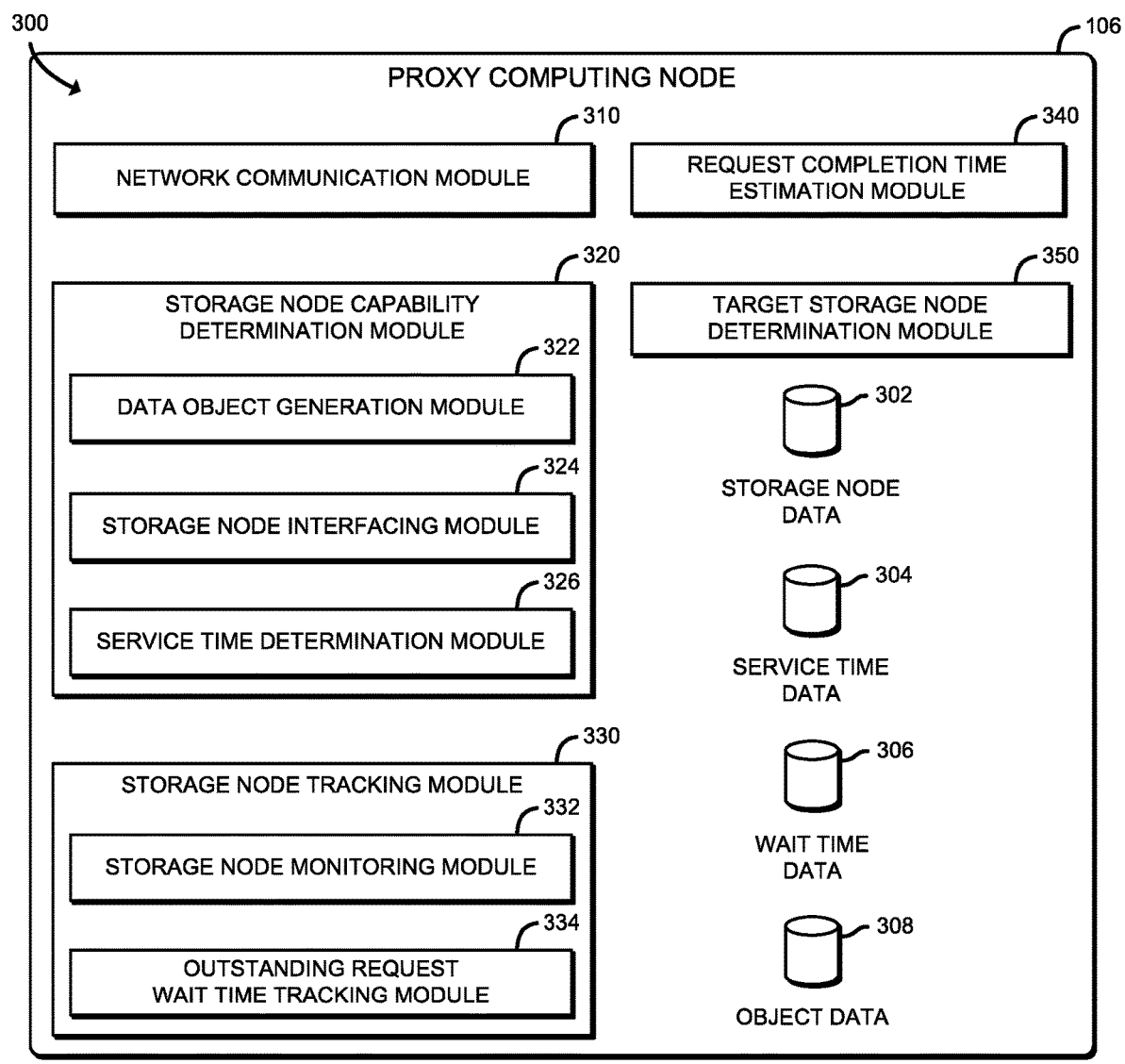
FIG. 3 is a simplified block diagram of at least one embodiment of an environment that may be established by the proxy computing node of FIGS. 1 and 2.

Referring now to FIG. 3, in an illustrative embodiment, the proxy computing node 106 establishes an environment 300 during operation. The illustrative environment 300 includes a network communication module 310, a storage node capability determination module 320, a storage node tracking module 330, a request completion time estimation module 340, and a target storage node determination module 350. Each of the modules, logic, and other components of the environment 300 may be embodied as hardware, software, firmware, or a combination thereof. For example, each of the modules, logic, and other components of the environment 300 may form a portion of, or otherwise be established by, the processor 202, the communication circuitry 210 (e.g., the NIC 212), and/or other hardware components of the proxy computing node 106. As such, in some embodiments, one or more of the modules of the environment 300 may be embodied as circuitry or a collection of electrical devices (e.g., network communication circuitry 310, storage node capability determination circuitry 320, storage node tracking circuitry 330, request completion time estimation circuitry 340, target storage node determination circuitry 350, etc.).

In the illustrative environment 300, the proxy computing node 106 includes storage node data 302, service time data 304, wait time data 306, and object data 308, each of which may be accessed by the various modules and/or sub-modules of the proxy computing node 106. It should be appreciated that the proxy computing node 106 may include other components, sub-components, modules, sub-modules, and/or or devices commonly found in a computing node, which are not illustrated in FIG. 3 for clarity of the description.

The network communication module 310 is configured to facilitate inbound and outbound network communications (e.g., network traffic, network packets, network flows, etc.) to and from the proxy computing node 106. To do so, the network communication module 310 is configured to receive and process network packets from other computing devices (e.g., the client computing node 102, the storage nodes 110, and/or other computing device(s) communicatively coupled via the access network 104 and/or the storage network 108). Additionally, the network communication module 310 is configured to prepare and transmit network packets to another computing device (e.g., the client computing node 102, the storage nodes 110, and/or other computing device(s) communicatively coupled via the access network 104 and/or the storage network 108). Accordingly, in some embodiments, at least a portion of the functionality of the network communication module 310 may be performed by the communication circuitry 210, and more specifically by the NIC 212.

The storage node capability determination module 320 is configured to determine performance capabilities of each of the storage nodes 110. To do so, the storage node capability determination module 320 includes a data object generation module 322, a storage node interfacing module 324, and a service time determination module 326. The data object generation module 322 is configured to generate a plurality of data objects for testing (i.e., test data objects), the size of each of which is based on a different one of a plurality of size ranges.

For example, in one embodiment, the plurality of size ranges may include a first size range for objects with a size of less than 1 KB, a second size range for objects with a size of at least 1 KB to less than 100 KB, a third size range for objects with a size of at least 100 KB to less than 512 KB, a fourth size range for objects with a size of at least 512 KB to less than 10 MB, a fifth size range for objects with a size of at least 10 MB to less than 100 MB, and a sixth size range for objects with a size greater than 100 MB. Accordingly, in such an embodiments, the data object generation module 322 is configured to generate a test data object of a particular size for each of the size ranges. In other words, the data object generation module 322 is configured to generate a number of test data objects, the size of each of which corresponds to a different size range. In some embodiments, the test data objects may be stored in the object data 308.

The data object size ranges may be based on information received via input to the proxy computing node 106, such as directly from an administrator or contained within a policy received from a controller (not shown) communicatively coupled to the proxy computing node 106. Additionally or alternatively, in some embodiments, the size ranges and corresponding service times may be stored at a table (i.e., a service time table) of the proxy computing node 106. In such embodiments, the service time table may be stored in the service time data 304. Additionally or alternatively, in some embodiments, the generated data objects may be stored The storage node interfacing module 324 is configured to transmit each of the data objects, such as the data objects generated by the object generation module 322, to each of the storage nodes 110. Accordingly, in some embodiments, the storage node interfacing module 324 may be configured to store data characteristic of the storage nodes 110, such as the internet protocol (IP) addresses of each of the storage nodes 110, local to the proxy computing node 106. In such embodiments, the characteristic data may be stored at the storage node data 302.

Additionally, the storage node interfacing module 324 is further configured to generate a queue of data object requests for each of the storage nodes 110. The queue of data object requests includes a data object request corresponding to a different one of the data objects transmitted to each of the storage nodes 110. The storage node interfacing module 324 is further configured to transmit each data object request from the queue of data object requests to a respective one of the storage nodes 110 and receive the data object requested from the one of the storage nodes 110 to which the data object request was transmitted. It should be appreciated that, in some embodiments, only one outstanding data object request may be in use at any given time. In other words, the next data object request in the queue may not be transmitted until the data object of the previously transmitted data object request has been received.

The service time determination module 326 is configured to determine a service time corresponding to each of the data object requests of the queue of data object requests for each of the storage nodes 110. To do so, in some embodiments, the service time determination module 326 may be configured to manage a timer of the proxy computing node 106 that is usable to determine a duration of time between transmitting a data object request and receiving the data object requested. For example, the service time determination module 326 may start the timer prior to the transmission of the data object request and stop the timer subsequent to receiving the data object requested. As such, the service time determination module 326 may determine the service time corresponding to the data object based on a value of the timer.

In some embodiments, the service time determination module 326 may store the service time in a table (i.e., a service time table) at an entry that corresponds to a size range from which the data object was created to test. It should be appreciated that the service time determination module 326 may employ the same service time determination for data objects requested subsequent to performing the capability determination. In other words, the service time determination module 326 may update the service time table during normal operation using the timer to determine service times usable to update a corresponding entry in the service time table. It should be appreciated that each of the storage nodes 110 may have different service times for a particular data object size range based on capabilities (e.g., processor capabilities, memory capacity, disk type, configurations, bandwidth, etc.) of the different storage nodes service (see, e.g., the data object request service times 402 of FIG. 4). In some embodiments, the service times may be stored in the service time data 304.

The storage node tracking module 330 is configured to track storage nodes 110 connected to the proxy computing node 106, as well as any data objects requests transmitted to each of the storage nodes 110 connected to the proxy computing node 106. To do so, the storage node tracking module 330 includes a storage node monitoring module 332 to track which storage nodes 110 are presently connected to the proxy computing node 106 and an outstanding request wait time tracking module 334 to track the present wait time of each of the storage nodes 110. Accordingly, the outstanding request wait time tracking module 334 may be configured to maintain a wait time for each of the storage nodes 110 to track the outstanding data object requests. In other words, the wait time for one of the storage nodes 110 corresponds to an estimated amount of time to complete a number of data object requests presently at that one of the storage nodes 110. Accordingly, the wait time is a sum of each of the service times corresponding to each of the outstanding data object requests (see, e.g., the pending data object request queue wait times 410 of FIG. 4). In some embodiments, the wait times may be stored in the wait time data 306.

As such, the outstanding request wait time tracking module 334 is further configured to update the wait time any time a data object request is transmitted to a corresponding one of the storage nodes 110 and any time a data object is received from the corresponding one of the storage nodes 110. For example, upon determining which of the storage nodes 110 to transmit the data object request, the outstanding request wait time tracking module 334 can update the wait time of that one of the storage nodes 110 by adding the service time corresponding to the size of the data object being requested by the data object request to the wait time. Similarly, upon receiving a data object from one of the storage nodes 110, the outstanding request wait time tracking module 334 can update the wait time of that one of the storage nodes 110 by subtracting the service time corresponding to the received data object from the wait time.

The request completion time estimation module 340 is configured to estimate a request completion time for a data object request for each of the storage nodes 110 on which the corresponding data object is stored. To do so, the request completion time estimation module 340 is configured to retrieve a service time of the data object request based on a size of the data object of the data object request for each of the storage nodes 110 on which the corresponding data object is stored.

Figure 4:
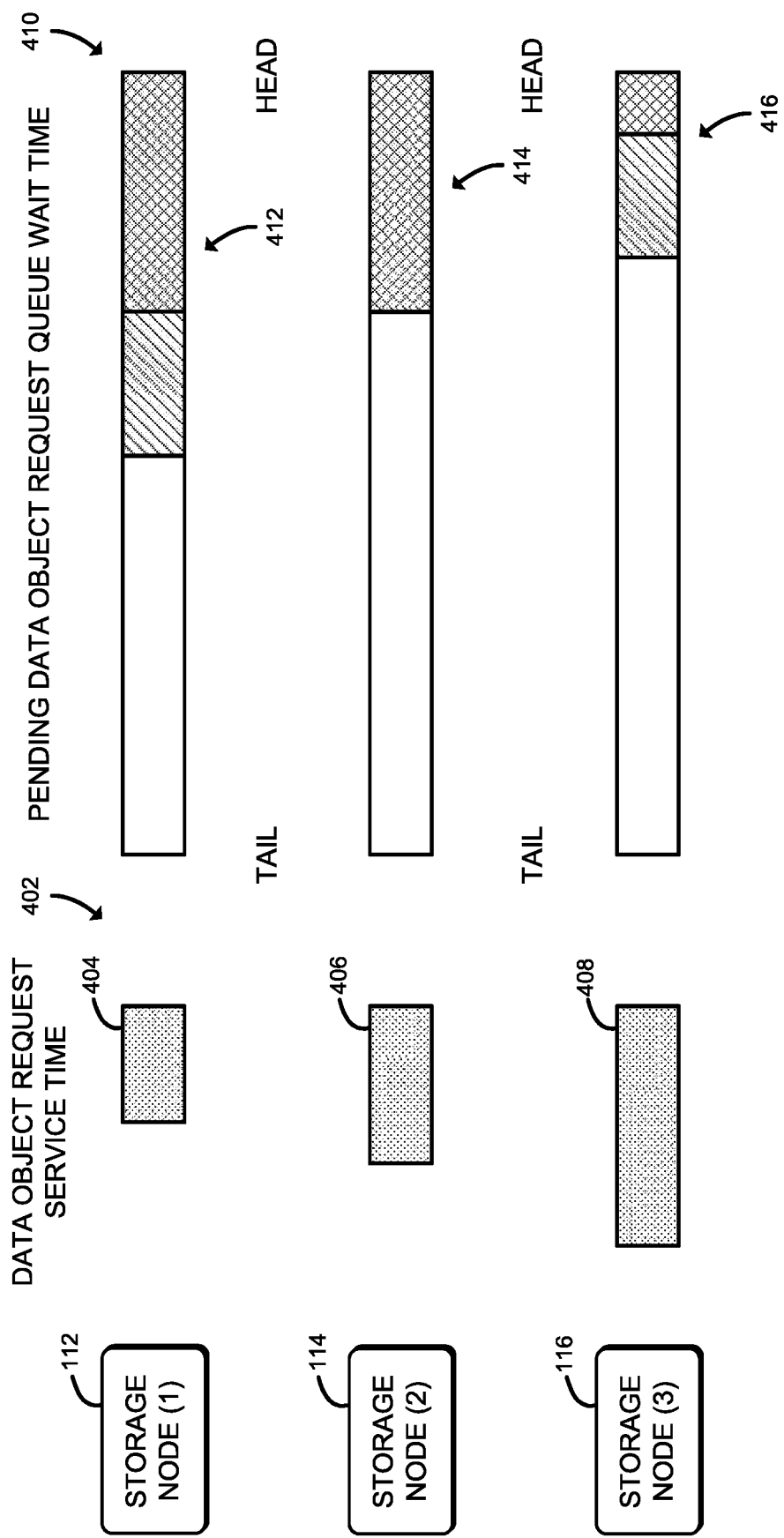
FIGS. 4 and 5 are a simplified illustration of at least one embodiment of request queues of storage nodes of the system of FIG. 1 usable by the proxy computing node of FIGS. 1 and 2 for determining the storage node(s) from which to request a data object.
Figure 5:
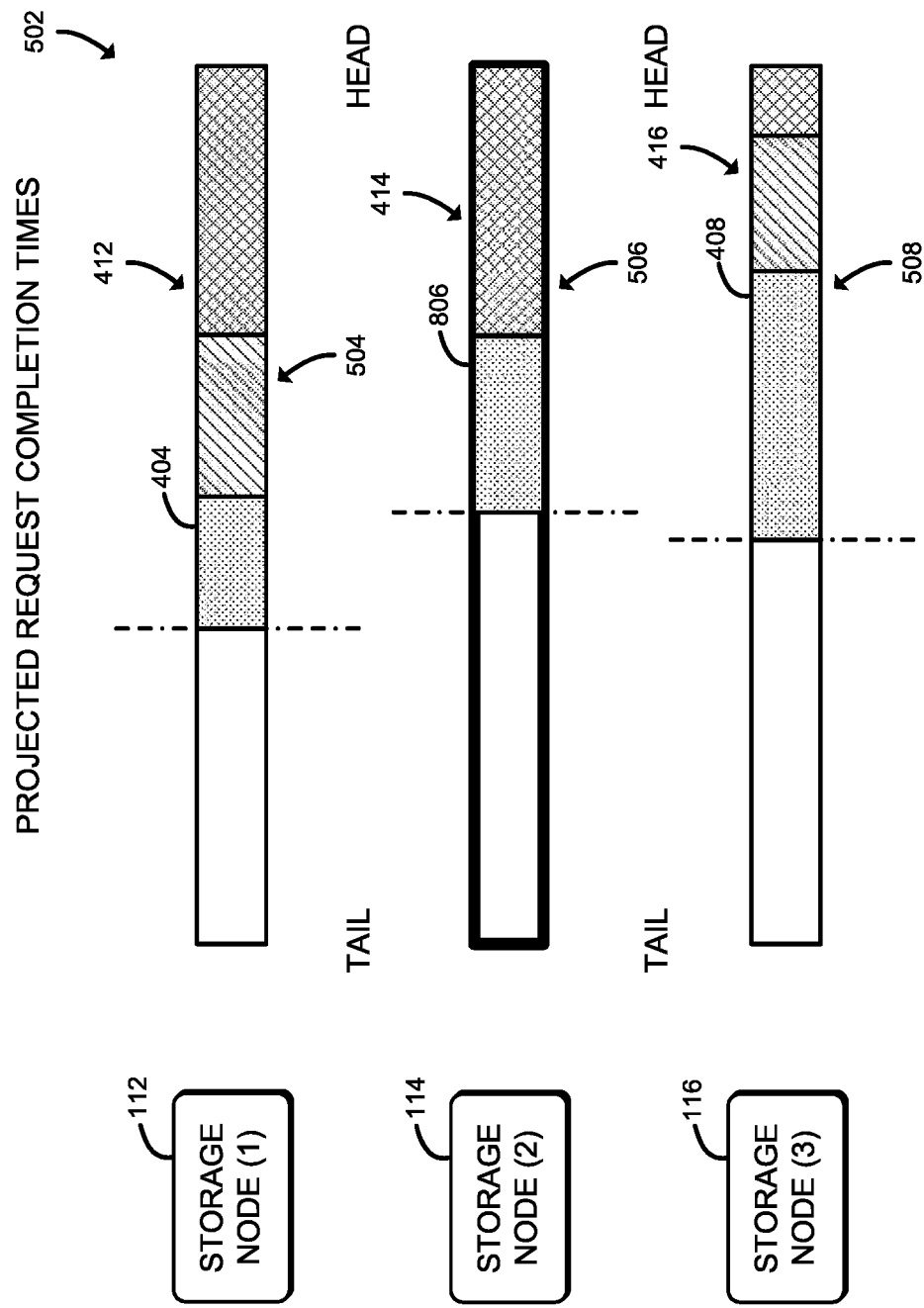

For example, as shown in FIG. 4, the request completion time estimation module 340 can retrieve each of the service times 404, 406, and 408 for each of the storage nodes 112, 114, and 116, respectively, each of which has been identified as a subset of the storage nodes at which the data object is presently stored. Referring again to FIG. 3, the request completion time estimation module 340 is further configured to retrieve a wait time for each of the storage nodes 110 on which the corresponding data object is stored. In furtherance of the previous example, as also shown in FIG. 4, the request completion time estimation module 340 can retrieve each of the wait times 412, 414, and 416 for each of the storage nodes 112, 114, and 116, respectively. Accordingly, referring again to FIG. 3, the request completion time estimation module 340 can determine a request completion time for each of the storage nodes 110 on which the corresponding data object is stored based on the retrieved service time and wait time for each of those storage nodes 110. As shown in FIG. 5, a projected request completion times 502 includes request completion times 504, 506, and 508 for each of the storage nodes 112, 114, and 116, respectively, can be estimated based on adding the service times 404, 406, and 408 to the respective wait times 412, 414, and 416 for each of the storage nodes 112, 114, and 116.

Referring again to FIG. 3, the target storage node determination module 350 is configured to determine a target storage node from one of the storage nodes 110 at which a data object is stored and transmit a data object request to retrieve the data object from the determined target storage node. For example, referring again to FIG. 5, despite the storage node (2) 114 not having the shortest service time, nor the shortest wait time, the storage node (2) 114 does have the shortest request completion time 506. As such, referring again to FIG. 3, the target storage node determination module 350 would determine the storage node (2) 114 to be the target storage node in this particular example, as indicated by the highlight around the request completion time 506 corresponding to the storage node (2) 114. Accordingly, the target storage node determination module 350 can generate and transmit a data object request to retrieve the data object from the storage node (2) 114.

Figure 6:
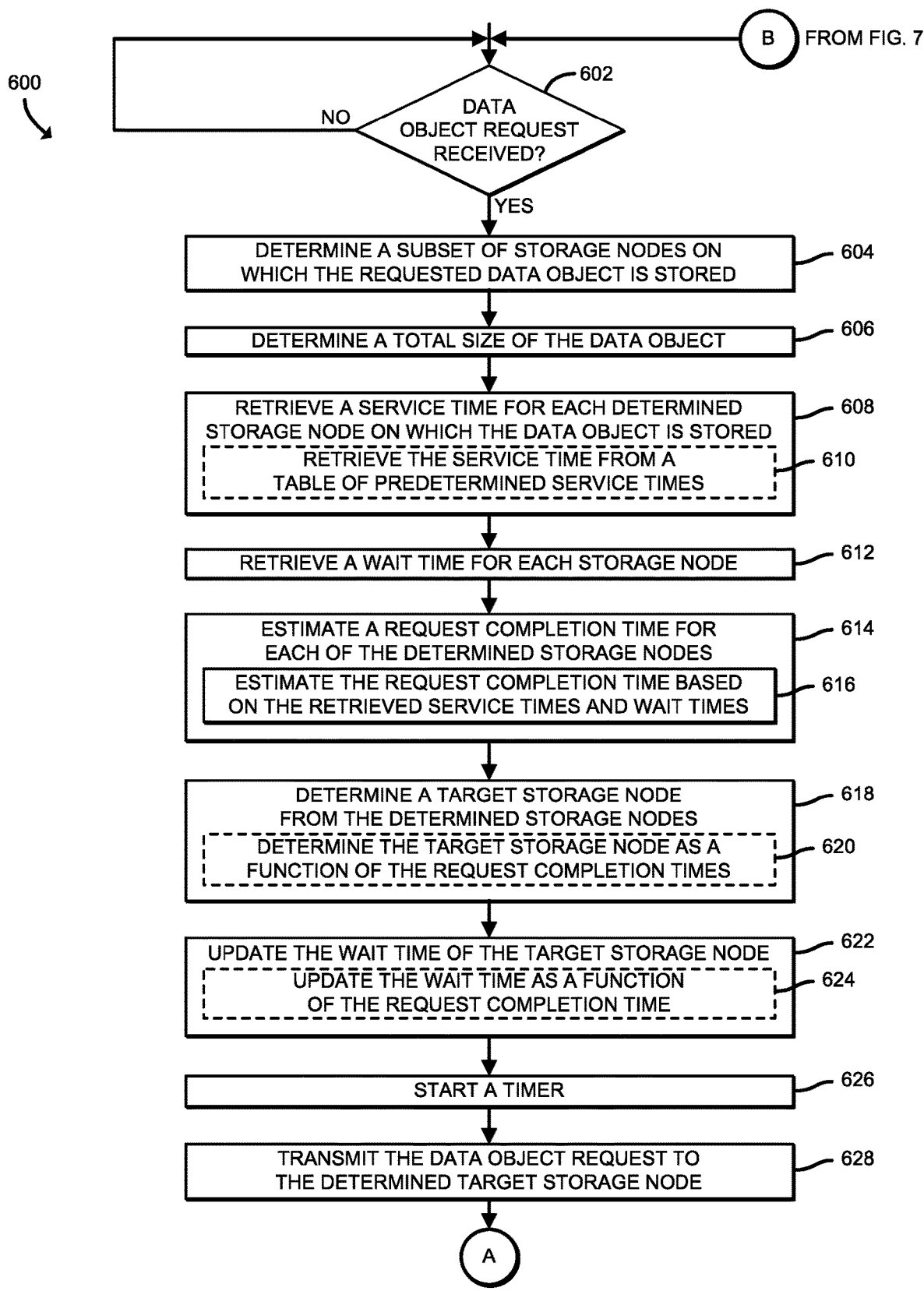
FIGS. 6 and 7 are a simplified flow diagram of at least one embodiment of a method for managing data object requests in a storage node cluster that may be executed by the proxy computing node of FIGS. 1 and 2.
Figure 7:
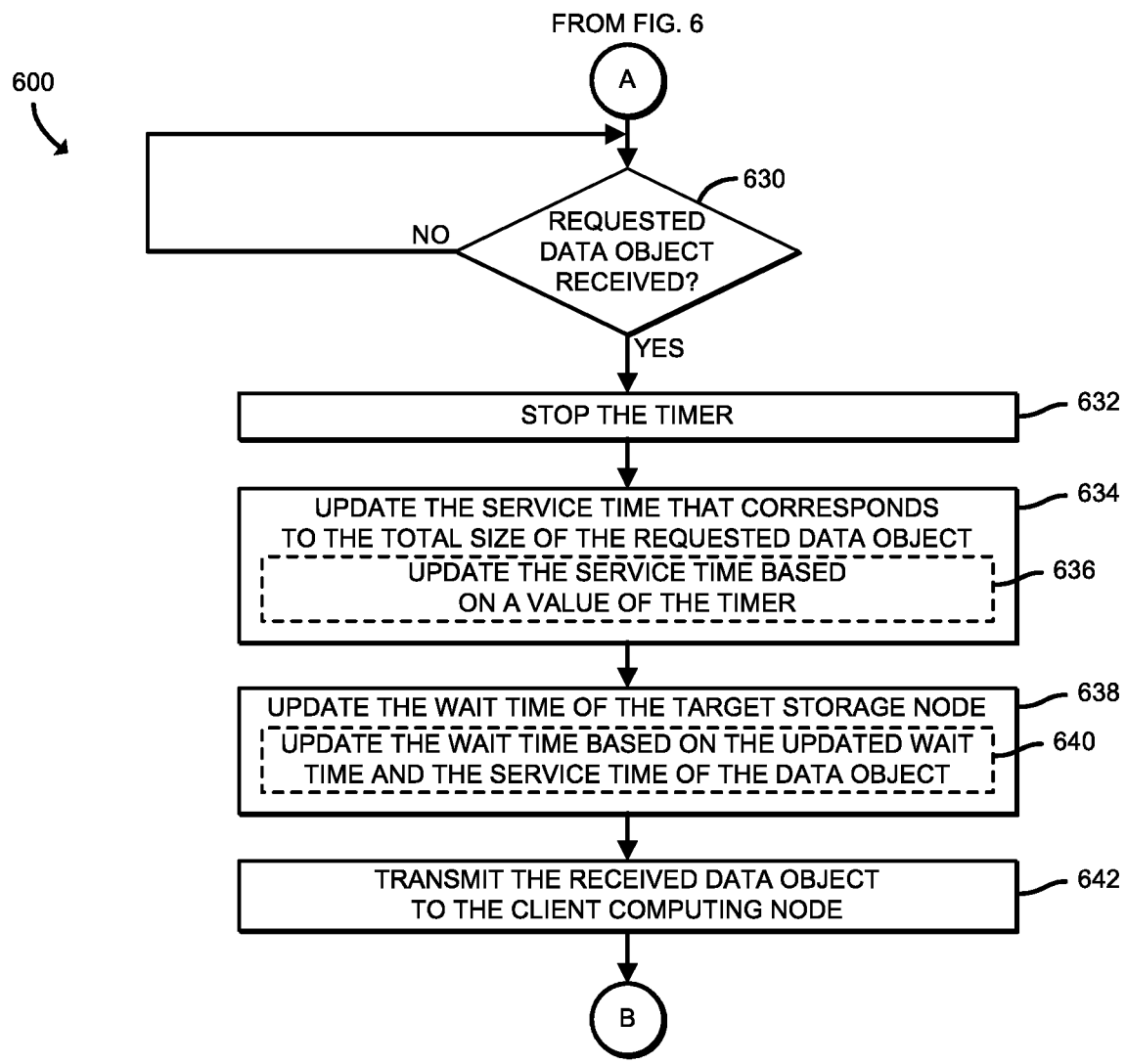

Referring now to FIGS. 6 and 7, in use, the proxy computing node 106 may execute a method 600 for managing data object requests in a storage node cluster (e.g., the cluster of storage nodes 110 of FIG. 1) to steer request network traffic towards certain of the storage nodes 110 for better overall performance of the cluster. It should be appreciated that at least a portion of the method 600 may be offloaded to and executed by the NIC 212 of the proxy computing node 106. It should be further appreciated that, in some embodiments, the method 600 may be embodied as various instructions stored on a computer-readable media, which may be executed by the processor 202, the NIC 212, and/or other components of the proxy computing node 106 to cause the proxy computing node 106 to perform the method 600. The computer-readable media may be embodied as any type of media capable of being read by the proxy computing node 106 including, but not limited to, the memory 206, the data storage device 208, a local memory of the NIC 212, other memory or data storage devices of the proxy computing node 106, portable media readable by a peripheral device of the proxy computing node 106, and/or other media.

The method 600 begins with block 602, in which the proxy computing node 106 determines whether a network packet that includes a data object request was received by the proxy computing node 106, such as from the client computing node 102. If the data object request was not received, the method 600 loops back to block 602 to continue to determine whether the data object request was received. Otherwise, if the data object request was received, the method 600 advances to block 604. In block 604, the proxy computing node 106 determines a subset of the storage nodes 110 on which the data object was previously stored.

In block 606, the proxy computing node 106 determines a total size of the data object requested. In block 608, proxy computing node 106 retrieves an estimated service time for each of the subset of the storage nodes 110 determined in block 604. In some embodiments, in block 610, the proxy computing node 106 may retrieve the service time from a table of predetermined service times (i.e., a service time table) based on the total size of the data object requested determined in block 606. For example, in some embodiments, the proxy computing node 106 may compare the total size of the data object requested against a table of size ranges and retrieve the service time corresponding to a size range of the table in which the total size of the data object requested resides. As described previously, the service time is an estimated amount of time to retrieve the data object of the data object request from a particular one of the subset of storage nodes 110. It should be appreciated that the service time identifies an estimated service time, as the data object requested may not be the same size as the data object tested for that size range.

In block 612, the proxy computing node 106 retrieves a wait time for each of the subset of storage nodes 110. As described previously, the wait time identifies an estimated amount of time to complete a number of data object requests presently at one of the subset of the storage nodes 110. In block 614, the proxy computing node 106 estimates a request completion time for each of the subset of storage nodes 110. To do so, in block 616, the proxy computing node 106 estimates the request completion time based on the service time retrieved in block 608 and the wait time retrieved in block 612. For example, the proxy computing node 106 may estimate the request completion time as a sum of the retrieved service time and wait time.

In block 618, the proxy computing node 106 determines a target storage node from the subset of storage nodes 110 from which to retrieve the requested data object. To do so, in some embodiments, in block 620, the proxy computing node 106 determines the target storage node as a function of the request completion times determined in block 614. For example, the proxy computing node 106 may select one of the subset of storage nodes 110 based on which of the subset of storage nodes 110 has the shortest request completion time (see, e.g., the projected request completion times 502 FIG. 5).

In block 622, the proxy computing node 106 updates the wait time of the target storage node determined in block 618. To do so, in some embodiments, in block 624, the proxy computing node 106 updates the wait time as a function of the request completion time. For example, in some embodiments, the updated wait time is equivalent to the request completion time. In block 626, the proxy computing node 106 starts a timer of the proxy computing node 106. In block 628, the proxy computing node 106 transmits the received data object request to the target storage node determined in block 618.

In block 630, the proxy computing node 106 determines whether the requested data object was received by the proxy computing node 106. If not, the method 600 loops back to block 630 to continue to determine whether the requested data object was received. Otherwise, if the requested data object was received, the method advances to block 632, wherein the proxy computing node 106 stops the timer started in block 626. In block 634, the proxy computing node 106 updates the service time that corresponds to the total size of the data object requested. Accordingly, in such embodiments wherein the service time is stored in the service time table, the corresponding data object size range entry may be updated. It should be appreciated that updating the corresponding data object size range entry may be based on other variables, such as a moving weighted average resulting from a combination of the results over a number of historical data objects received within the data object size range. In some embodiments, in block 636, the proxy computing node 106 updates the service time based on a value of the timer.

In block 638, the proxy computing node 106 updates the wait time of the target storage node. In some embodiments, in block 640, the proxy computing node 106 updates the wait time of the target storage node based on the wait time updated in block 624 and the service time corresponding to the data object received. In block 642, the proxy computing node 106 transmits the received data object to the client computing node (e.g., the client computing node 102) that initiated the request.

Figure 8:
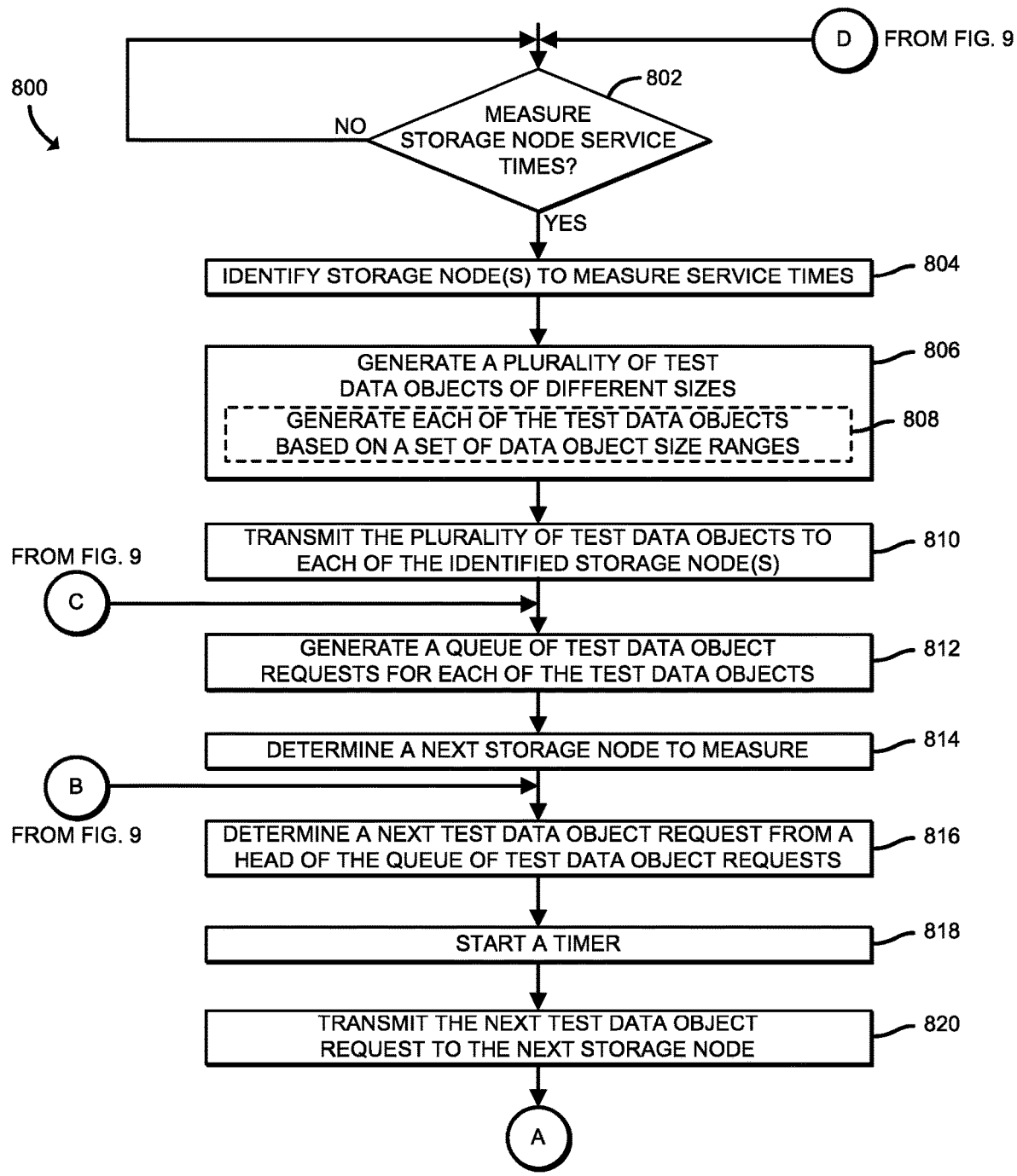
FIGS. 8 and 9 are a simplified flow diagram of at least one embodiment of a method for populating a table of service times that may be executed by the proxy computing node of FIGS. 1 and 2.
Figure 9:
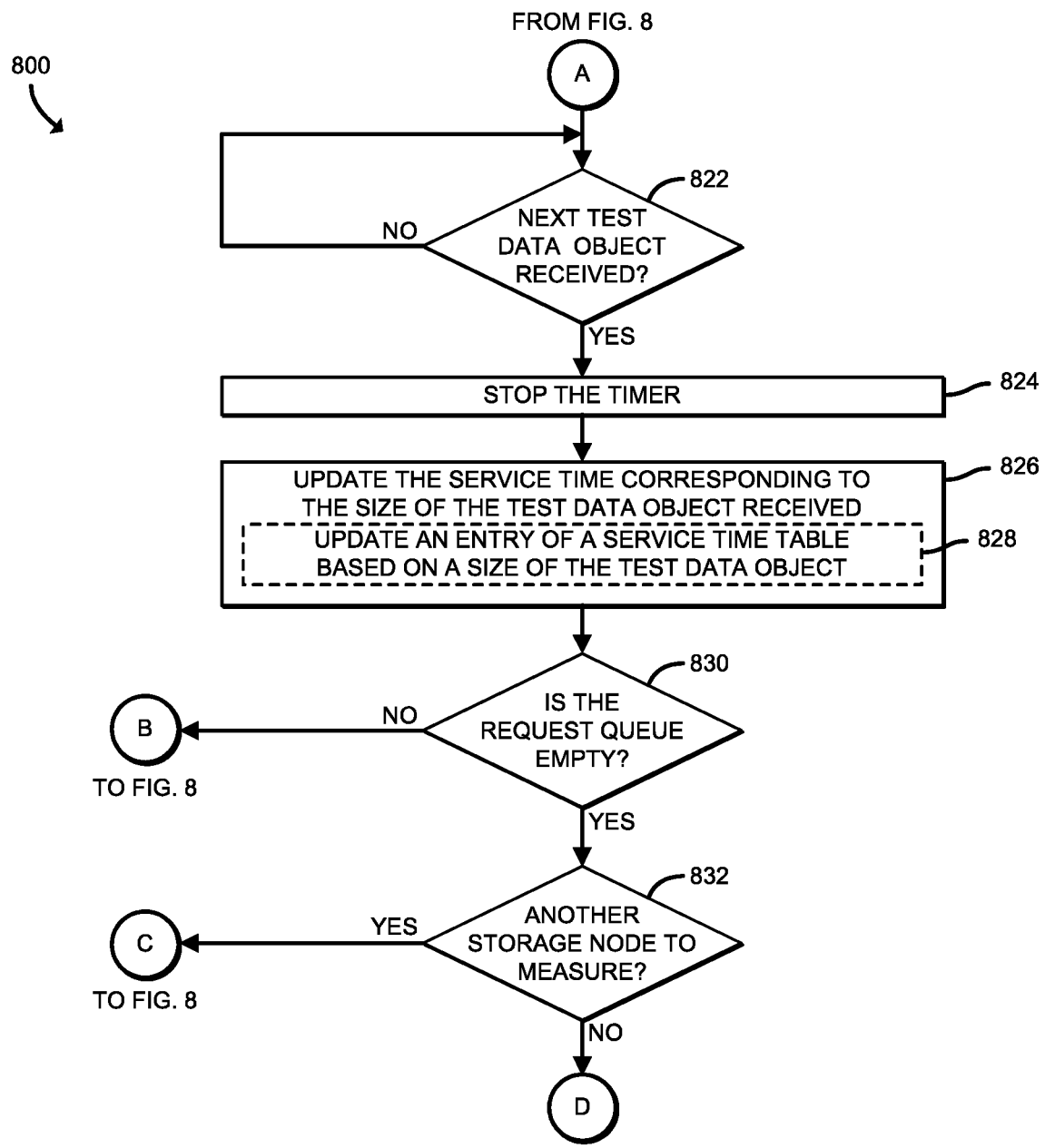

Referring now to FIGS. 8 and 9, in use, the proxy computing node 106 may execute a method 800 for populating a table of service times. It should be appreciated that at least a portion of the method 800 may be offloaded to and executed by the NIC 212 of the proxy computing node 106. It should be further appreciated that, in some embodiments, the method 800 may be embodied as various instructions stored on a computer-readable media, which may be executed by the processor 202, the NIC 212, and/or other components of the proxy computing node 106 to cause the proxy computing node 106 to perform the method 800. The computer-readable media may be embodied as any type of media capable of being read by the proxy computing node 106 including, but not limited to, the memory 206, the data storage device 208, a local memory of the NIC 212, other memory or data storage devices of the proxy computing node 106, portable media readable by a peripheral device of the proxy computing node 106, and/or other media.

The method 800 begins with block 802, in which the proxy computing node 106 determines whether to measure service times of each of the storage nodes (e.g., the cluster of storage nodes 110 of FIG. 1). In some embodiments, the determination may be initiated by a request or automatically based on a configuration change of the storage node cluster. If the service times are not to be measured, the method 800 loops back to block 802 to continue to determine whether to measure the service times of each of the storage nodes 110. Otherwise, if the service times are to be measured, the method 800 advances to block 804. In block 804, the proxy computing node 106 identifies which of the storage nodes 110 are to be measured.

For example, the proxy computing node 106 may determine to only measure service times for a particular storage node, such as a newly installed storage node, or more than one storage node, such as upon initial setup of the storage node cluster. Accordingly, in such embodiments wherein the determination at block 802 is initiated by a request, the request may include the storage nodes to measure. Similarly, in such embodiments wherein the determination at block 802 is initiated by a configuration change, the proxy computing node 106 may automatically measure service times for those storage nodes that resulted from the configuration change.

In block 806, the proxy computing node 106 generates a plurality of test data objects of different sizes. In some embodiments, in block 808, the proxy computing node 106 may generate each of the test data objects based on a set of data object size ranges, which may be predetermined based on a policy, for example. In block 810, the proxy computing node 106 transmits each of the plurality of test data objects to the identified storage node(s). In block 812, the proxy computing node 106 generates a queue of test data object requests for each of the generated test data objects. In block 814, the proxy computing node 106 determines a next storage node to measure service time for from the one or more storage nodes identified at block 804.

In block 816, the proxy computing node 106 determines a next test data object request from a head of the queue of test data object requests. In block 818, the proxy computing node 106 starts a timer of the proxy computing node 106. In block 820, the proxy computing node 106 transmits the next test data object request to the next storage node to retrieve the next data object. In block 822, the proxy computing node 106 determines whether the next test data object was received. If not, the method 800 loops back to block 822 to determine whether the next test data object was received. Otherwise, if the next test data object was received, the method 800 advances to block 824, wherein the proxy computing node 106 stops the timer started in block 818.

In block 826, the proxy computing node 106 updates the service time corresponding to the size of the test data object received. In some embodiments, in block 828, the proxy computing node 106 updates the service time in a corresponding entry of a service time table based on the size of the test data object and the size range of the entry. In block 830, the proxy computing node 106 determines whether the test data object request queue is empty. If not, the method 800 returns to block 816 to determine a next test data object request from a head of the queue. Otherwise, if the queue is empty, the method 800 advances to block 832, wherein the proxy computing node 106 determines whether another of the storage nodes identified in block 804 is to be measured. If not, the method returns to block 802 to determine whether to measure storage node service times of one or more storage nodes. Otherwise, if the proxy computing node 106 determines that another storage node is to be measured, the method 800 returns to block 812 wherein the proxy computing node 106 generates another queue of test data object requests for each of the test data objects generated at block 806.

EXAMPLES

Illustrative examples of the technologies disclosed herein are provided below. An embodiment of the technologies may include any one or more, and any combination of, the examples described below.

Example 1 includes a proxy computing node for managing data object requests in a storage node cluster, the proxy computing node comprising one or more processors; and one or more memory devices having stored therein a plurality of instructions that, when executed by the one or more processors, cause the proxy computing node to receive a data object request from a client computing device communicatively coupled to the proxy computing node, wherein the data object request identifies a requested data object to be retrieved by the proxy computing node; determine a subset of storage nodes from a set of storage nodes communicatively coupled to the proxy computing node, wherein each storage node of the subset of storage nodes contains a replication of the requested data object; obtain, for each of the subset of storage nodes, a service time that defines a second estimated amount of time to retrieve the requested data object from a corresponding storage node as a function of a total size of the requested data object; obtain, for each of the subset of storage nodes, a wait time that defines a first estimated amount of time to complete tasks presently assigned to the corresponding storage node of the subset of storage nodes; estimate, for each of the subset of storage nodes, a request completion time as a function of the wait time and the service time; determine, as a function of the request completion time, a target storage node from the subset of storage nodes to retrieve the requested data object from; and transmit the data object request to the target storage node to retrieve the replication of the requested data object from the target storage node.

Example 2 includes the subject matter of Example 1, and wherein to obtain the service time comprises to retrieve the service time from a table of service times, wherein each service time of the table corresponds to an estimated amount of time to receive a data object of a particular range of size from a particular storage node of the subset of storage nodes.

Example 3 includes the subject matter of any of Examples 1 and 2, and wherein the plurality of instructions further cause the proxy computing node to start, prior to transmitting the data object request, a timer of the proxy computing node; receive the requested data object; stop, subsequent to receiving the requested data object, the timer; determine an updated service time based on a value of the timer; and update the service time of the table based on the updated service time.

Example 4 includes the subject matter of any of Examples 1-3, and wherein to update the service time of the table based on the updated service time further comprises to update the service time of the table based on an exponentially weighted moving average.

Example 5 includes the subject matter of any of Examples 1-4, and wherein the plurality of instructions further cause the proxy computing node to update, subsequent to having updated the service time, the wait time of the target storage node based on a most recent wait time and the updated service time.

Example 6 includes the subject matter of any of Examples 1-5, and wherein the plurality of instructions further cause the proxy computing node to determine the wait time as a function of a previously calculated wait time of a particular storage node of the subset of storage nodes and the obtained service time of the particular storage node.

Example 7 includes the subject matter of any of Examples 1-6, and wherein to estimate the request completion time comprises to compare the request completion time of each of the subset of storage nodes and wherein to determine the target storage node comprises to select a storage node from the subset of storage nodes with a lowest request completion time.

Example 8 includes the subject matter of any of Examples 1-7, and wherein the plurality of instructions further cause the proxy computing node to update, subsequent to transmitting the data object request, the wait time of the target storage node as a function of a most recent wait time and the service time.

Example 9 includes the subject matter of any of Examples 1-8, and wherein the plurality of instructions further cause the proxy computing node to generate a plurality of test data objects of different file sizes based on a plurality of predetermined data object size ranges; transmit the test data objects to each of the storage nodes; and generate a queue of a plurality of test data object requests, wherein each test data object request defines a different test data object to be retrieved by the proxy computing node from one of the storage nodes.

Example 10 includes the subject matter of any of Examples 1-9, and wherein the plurality of instructions further cause the proxy computing node to transmit a test data object request of the test data object requests of the queue; receive the test data object corresponding to the test data object request; determine a duration of time between transmitting the test data object request and receiving the test data object; and determine an updated estimated service time of the table corresponding to the test data object request based on the duration of time; store the updated estimated service time at the table in a corresponding entry based on a total size of the test data object, wherein to estimate the request completion time comprises to estimate the request completion time as a function of the wait time and the updated estimated service time.

Example 11 includes the subject matter of any of Examples 1-10, and wherein to determine the duration of time between having transmitted and received the test data object comprises to (i) start a timer of the proxy computing node prior to transmitting the test data object request, (ii) stop the timer subsequent to receiving the test data object, and (iii) determine the duration of time as a function of a value of the timer.

Example 12 includes the subject matter of any of Examples 1-11, and wherein the plurality of instructions further cause the proxy computing node to store the updated estimated service time at the table in a corresponding entry based on a total size of the test data object.

Example 13 includes a method for managing data object requests in a storage node cluster, the method comprising receiving, by a proxy computing node, a data object request from a client computing device communicatively coupled to the proxy computing node, wherein the data object request identifies a requested data object to be retrieved by the proxy computing node; determining, by the proxy computing node, a subset of storage nodes from a set of storage nodes communicatively coupled to the proxy computing node, wherein each storage node of the subset of storage nodes contains a replication of the requested data object; obtaining, by the proxy computing node and for each of the subset of storage nodes, a wait time and a service time, wherein the wait time defines a first estimated amount of time to complete tasks presently assigned to a corresponding storage node of the subset of storage nodes, and wherein the service time defines a second estimated amount of time to retrieve the requested data object from the corresponding storage node as a function of a total size of the requested data object; estimating, by the proxy computing node and for each of the subset of storage nodes, a request completion time as a function of the wait time and the service time; determining, by the proxy computing node and as a function of the request completion time, a target storage node from the subset of storage nodes from which to retrieve the requested data object; and transmitting, by the proxy computing node, the data object request to the target storage node to retrieve the replication of the requested data object from the target storage node.

Example 14 includes the subject matter of Examples 13, and wherein obtaining the service time comprises retrieving the service time from a table of service times, wherein each service time of the table corresponds to an estimated amount of time to receive a data object of a particular range of size from a particular storage node of the subset of storage nodes.

Example 15 includes the subject matter of any of Examples 13 and 14, and further including starting, by the proxy computing node and prior to transmitting the data object request, a timer of the proxy computing node; receiving, by the proxy computing node, the requested data object; stopping, by the proxy computing node and subsequent to receiving the requested data object, the timer; determining, by the proxy computing node, an updated service time based on a value of the timer; and updating, by the proxy computing node, the service time of the table based on the updated service time.

Example 16 includes the subject matter of any of Examples 13-15, and wherein updating the service time of the table based on the updated service time further comprises updating the service time of the table based on an exponentially weighted moving average.

Example 17 includes the subject matter of any of Examples 13-16, and further including updating, by the proxy computing node and subsequent to updating the service time, the wait time of the target storage node based on a most recent wait time and the updated service time.

Example 18 includes the subject matter of any of Examples 13-17, and further including determining, by the proxy computing node, the wait time as a function of a previously calculated wait time of a particular storage node of the subset of storage nodes and the obtained service time of the particular storage node.

Example 19 includes the subject matter of any of Examples 13-18, and wherein estimating the request completion time comprises comparing the request completion time of each of the subset of storage nodes and wherein determining the target storage node comprises selecting a storage node from the subset of storage nodes with a lowest request completion time.

Example 20 includes the subject matter of any of Examples 13-19, and further including updating, by the proxy computing node and subsequent to transmitting the data object request, the wait time of the target storage node as a function of a most recent wait time and the service time.

Example 21 includes the subject matter of any of Examples 13-20, and further including generating, by the proxy computing node, a plurality of test data objects of different file sizes based on a plurality of predetermined data object size ranges; transmitting, by the proxy computing node, the test data objects to each of the storage nodes; and generating, by the proxy computing node, a queue of a plurality of test data object requests, wherein each test data object request defines a different test data object to be retrieved by the proxy computing node from one of the storage nodes.

Example 22 includes the subject matter of any of Examples 13-21, and further including transmitting, by the proxy computing node, a test data object request of the test data object requests of the queue; receiving, by the proxy computing node, the test data object corresponding to the test data object request; determining, by the proxy computing node, a duration of time between transmitting the test data object request and receiving the test data object; determining, by the proxy computing node, an updated estimated service time of the table corresponding to the test data object request based on the duration of time; and storing, by the proxy computing node, the updated estimated service time at the table in a corresponding entry based on a total size of the test data object.

Example 23 includes the subject matter of any of Examples 13-22, and wherein determining the duration of time between transmitting and receiving the test data object comprises (i) starting a timer of the proxy computing node prior to transmitting the test data object request, (ii) stopping the timer subsequent to receiving the test data object, and (iii) determining the duration of time as a function of a value of the timer.

Example 24 includes the subject matter of any of Examples 13-23, and further including storing the updated estimated service time at the table in a corresponding entry based on a total size of the test data object.

Example 25 includes a computing device comprising a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a proxy computing node for managing data object requests in a storage node cluster, the proxy computing node comprising network communication circuitry to receive a data object request from a client computing device communicatively coupled to the proxy computing node, wherein the data object request identifies a requested data object to be retrieved by the proxy computing node; storage node capability determination circuitry to (i) determine a subset of storage nodes from a set of storage nodes communicatively coupled to the proxy computing node, wherein each storage node of the subset of storage nodes contains a replication of the requested data object, and (ii) obtain, for each of the subset of storage nodes, a service time that defines a second estimated amount of time to retrieve the requested data object from the corresponding storage node as a function of a total size of the requested data object; storage node tracking circuitry to obtain, for each of the subset of storage nodes, a wait time that defines a first estimated amount of time to complete tasks presently assigned to a corresponding storage node of the subset of storage nodes; request completion time estimation circuitry to estimate, for each of the subset of storage nodes, a request completion time as a function of the wait time and the service time; and target storage node determination circuitry to determine, as a function of the request completion time, a target storage node from the subset of storage nodes to retrieve the requested data object from, wherein the network communication circuitry is further to transmit the data object request to the target storage node to retrieve the replication of the requested data object from the target storage node.

Example 28 includes the subject matter of Example 27, and wherein to obtain the service time comprises to retrieve the service time from a table of service times, wherein each service time of the table corresponds to an estimated amount of time to receive a data object of a particular range of size from a particular storage node of the subset of storage nodes.

Example 29 includes the subject matter of any of Examples 27 and 28, and wherein the storage node tracking circuitry is further to (i) start, prior to transmitting the data object request, a timer of the proxy computing node, (ii) receive the requested data object, and (iii) stop, subsequent to receiving the requested data object, the timer, and wherein the storage node capability determination circuitry is further to (i) determine an updated service time based on a value of the timer and (ii) update the service time of the table based on the updated service time.

Example 30 includes the subject matter of any of Examples 27-29, and wherein to update the service time of the table based on the updated service time further comprises to update the service time of the table based on an exponentially weighted moving average.

Example 31 includes the subject matter of any of Examples 27-30, and wherein the storage node tracking circuitry is further to update, subsequent to having updated the service time, the wait time of the target storage node based on a most recent wait time and the updated service time.

Example 32 includes the subject matter of any of Examples 27-31, and wherein the storage node tracking circuitry is further to determine the wait time as a function of a previously calculated wait time of a particular storage node of the subset of storage nodes and the obtained service time of the particular storage node.

Example 33 includes the subject matter of any of Examples 27-32, and wherein to estimate the request completion time comprises to compare the request completion time of each of the subset of storage nodes and wherein to determine the target storage node comprises to select a storage node from the subset of storage nodes with a lowest request completion time.

Example 34 includes the subject matter of any of Examples 27-33, and wherein the storage node tracking circuitry is further to update, subsequent to transmitting the data object request, the wait time of the target storage node as a function of a most recent wait time and the service time.

Example 35 includes the subject matter of any of Examples 27-34, and wherein the storage node capability determination circuitry is further to (i) generate a plurality of test data objects of different file sizes based on a plurality of predetermined data object size ranges, wherein the network communication circuitry is further to transmit the test data objects to each of the storage nodes, and wherein the storage node capability determination circuitry is further to generate a queue of a plurality of test data object requests, wherein each test data object request defines a different test data object to be retrieved by the proxy computing node from one of the storage nodes.

Example 36 includes the subject matter of any of Examples 27-35, and wherein the network communication circuitry is further to (i) transmit a test data object request of the test data object requests of the queue and (ii) receive the test data object corresponding to the test data object request, wherein the storage node capability determination circuitry is further to determine a duration of time between transmitting the test data object request and receiving the test data object, wherein the storage node capability determination circuitry is further to (i) determine an updated estimated service time of the table corresponding to the test data object request based on the duration of time and (ii) store the updated estimated service time at the table in a corresponding entry based on a total size of the test data object, and wherein to estimate the request completion time comprises to estimate the request completion time as a function of the wait time and the updated estimated service time.

Example 37 includes the subject matter of any of Examples 27-36, and wherein to determine the duration of time between having transmitted and received the test data object comprises to (i) start a timer of the proxy computing node prior to transmitting the test data object request, (ii) stop the timer subsequent to receiving the test data object, and (iii) determine the duration of time as a function of a value of the timer.

Example 38 includes the subject matter of any of Examples 27-37, and wherein the storage node determination circuitry is further to store the updated estimated service time at the table in a corresponding entry based on a total size of the test data object.

Example 39 includes a proxy computing node for managing data object requests in a storage node cluster, the proxy computing node comprising means for receiving a data object request from a client computing device communicatively coupled to the proxy computing node, wherein the data object request identifies a requested data object to be retrieved by the proxy computing node; means for determining a subset of storage nodes from a set of storage nodes communicatively coupled to the proxy computing node, wherein each storage node of the subset of storage nodes contains a replication of the requested data object; means for obtaining, for each of the subset of storage nodes, a wait time and a service time, wherein the wait time defines a first estimated amount of time to complete tasks presently assigned to a corresponding storage node of the subset of storage nodes, and wherein the service time defines a second estimated amount of time to retrieve the requested data object from the corresponding storage node as a function of a total size of the requested data object; means for estimating, for each of the subset of storage nodes, a request completion time as a function of the wait time and the service time; means for determining, by the proxy computing node and as a function of the request completion time, a target storage node from the subset of storage nodes from which to retrieve the requested data object; and means for transmitting the data object request to the target storage node to retrieve the replication of the requested data object from the target storage node.

Example 40 includes the subject matter of Example 39, and wherein the means for obtaining the service time comprises means for retrieving the service time from a table of service times, wherein each service time of the table corresponds to an estimated amount of time to receive a data object of a particular range of size from a particular storage node of the subset of storage nodes.

Example 41 includes the subject matter of any of Examples 39 and 40, and further including means for starting, by the proxy computing node and prior to transmitting the data object request, a timer of the proxy computing node; means for receiving, by the proxy computing node, the requested data object; means for stopping, by the proxy computing node and subsequent to receiving the requested data object, the timer; means for determining, by the proxy computing node, an updated service time based on a value of the timer; and means for updating, by the proxy computing node, the service time of the table based on the updated service time.

Example 42 includes the subject matter of any of Examples 39-41, and wherein the means for updating the service time of the table based on the updated service time further comprises means for updating the service time of the table based on an exponentially weighted moving average.

Example 43 includes the subject matter of any of Examples 39-42, and further including means for updating, subsequent to updating the service time, the wait time of the target storage node based on a most recent wait time and the updated service time.

Example 44 includes the subject matter of any of Examples 39-43, and further including means for determining the wait time as a function of a previously calculated wait time of a particular storage node of the subset of storage nodes and the obtained service time of the particular storage node.

Example 45 includes the subject matter of any of Examples 39-44, and wherein the means for estimating the request completion time comprises means for comparing the request completion time of each of the subset of storage nodes and wherein the means for determining the target storage node comprises means for selecting a storage node from the subset of storage nodes with a lowest request completion time.

Example 46 includes the subject matter of any of Examples 39-45, and further including means for updating, subsequent to transmitting the data object request, the wait time of the target storage node as a function of a most recent wait time and the service time.

Example 47 includes the subject matter of any of Examples 39-46, and further including means for generating a plurality of test data objects of different file sizes based on a plurality of predetermined data object size ranges; means for transmitting the test data objects to each of the storage nodes; and means for generating a queue of a plurality of test data object requests, wherein each test data object request defines a different test data object to be retrieved by the proxy computing node from one of the storage nodes.

Example 48 includes the subject matter of any of Examples 39-47, and further including means for transmitting a test data object request of the test data object requests of the queue; means for receiving the test data object corresponding to the test data object request; means for determining a duration of time between transmitting the test data object request and receiving the test data object; means for determining an updated estimated service time of the table corresponding to the test data object request based on the duration of time; and means for storing the updated estimated service time at the table in a corresponding entry based on a total size of the test data object.

Example 49 includes the subject matter of any of Examples 39-48, and wherein the means for determining the duration of time between transmitting and receiving the test data object comprises means for (i) starting a timer of the proxy computing node prior to transmitting the test data object request, (ii) stopping the timer subsequent to receiving the test data object, and (iii) determining the duration of time as a function of a value of the timer.

Example 50 includes the subject matter of any of Examples 39-49, and further including means for storing the updated estimated service time at the table in a corresponding entry based on a total size of the test data object.

The invention claimed is:

1. A proxy computing node for managing data object requests in a storage node cluster, the proxy computing node comprising:
   one or more processors; and
   one or more memory devices having stored therein a plurality of instructions that, when executed by the one or more processors, cause the proxy computing node to:
      receive a data object request from a client computing device communicatively coupled to the proxy computing node, wherein the data object request identifies a requested data object to be retrieved by the proxy computing node;
      determine a subset of storage nodes from a set of storage nodes communicatively coupled to the proxy computing node, wherein each storage node of the subset of storage nodes contains a replication of the requested data object;
      obtain, for each of the subset of storage nodes that contains the replication of the requested data object, a service time that defines a first estimated amount of time to retrieve the requested data object from a corresponding storage node as a function of a total size of the requested data object, wherein to obtain the service time comprises to retrieve the service time from a table of service times, wherein each service time of the table of service times corresponds to an estimated amount of time to receive a data object of a particular range of size from a particular storage node of the subset of storage nodes, and wherein at least one estimated amount of time to receive a data object of a particular range of size from a particular storage node of the subset of storage nodes includes an estimated transit time from the particular storage node to the proxy computing node;
      obtain, for each of the subset of storage nodes that contains the replication of the requested data object, a wait time that defines a second estimated amount of time to complete tasks presently assigned to the corresponding storage node of the subset of storage nodes that contains the replication of the requested data object, wherein the wait time is to represent outstanding data object requests to the corresponding storage node of the subset of storage nodes that contains the replication of the requested data object;
      estimate, for each of the subset of storage nodes that contains the replication of the requested data object, an estimated completion time as a function of the wait time and the service time, wherein to estimate the estimated completion time comprises to compare the estimated completion time of each of the subset of storage nodes that contains the replication of the requested data object;
      determine, as a function of the estimated completion time, a target storage node from the subset of storage nodes that contains the replication of the requested data object to retrieve the requested data object from, wherein to determine the target storage node comprises selecting a storage node from the subset of storage nodes that contains the replication of the requested data object with a lowest estimated completion time; and
      transmit the data object request to the target storage node to retrieve the replication of the requested data object from the target storage node.

2. The proxy computing node of claim 1, wherein the plurality of instructions further cause the proxy computing node to:
   start, prior to having transmitted the data object request, a timer of the proxy computing node;
   receive the requested data object;
   stop, subsequent to having received the requested data object, the timer;
   determine an updated service time based on a value of the timer; and
   update the service time at a corresponding entry of the table of service times based on the updated service time.

3. The proxy computing node of claim 2, wherein to update the service time of the table of service times based on the updated service time further comprises to update the service time of the table of service times based on an exponentially weighted moving average.

4. The proxy computing node of claim 2, wherein the plurality of instructions further cause the proxy computing node to update, subsequent to having updated the service time, the wait time of the target storage node based on a most recent wait time and the updated service time.

5. The proxy computing node of claim 1, wherein the plurality of instructions further cause the proxy computing node to determine the wait time as a function of a previously calculated wait time for a particular storage node of the subset of storage nodes and the obtained service time of the particular storage node.

6. The proxy computing node of claim 1, wherein the plurality of instructions further cause the proxy computing node to update, subsequent to having transmitted the data object request, the wait time of the target storage node as a function of a most recent wait time and the service time.

7. The proxy computing node of claim 1, wherein the plurality of instructions further cause the proxy computing node to:
  generate a plurality of test data objects of different file sizes based on a plurality of predetermined data object size ranges;
  transmit the test data objects to each of the storage nodes; and
  generate a queue of a plurality of test data object requests, wherein each test data object request defines a different test data object to be retrieved by the proxy computing node from one of the storage nodes.

8. The proxy computing node of claim 7, wherein the plurality of instructions further cause the proxy computing node to:
  transmit a test data object request of the test data object requests of the queue;
  receive the test data object corresponding to the test data object request;
  determine a duration of time between having transmitted the test data object request and having received the test data object; and
  determine an updated estimated service time of the table of service times corresponding to the test data object request based on the duration of time;
  store the updated estimated service time at the table of service times in a corresponding entry based on a total size of the test data object, wherein to estimate the estimated completion time comprises to estimate the estimated completion time as a function of the wait time and the updated estimated service time.

9. The proxy computing node of claim 8, wherein to determine the duration of time between having transmitted and received the test data object comprises to (i) start a timer of the proxy computing node prior to having transmitted the test data object request, (ii) stop the timer subsequent to having received the test data object, and (iii) determine the duration of time as a function of a value of the timer.

10. One or more non-transitory, computer-readable storage media comprising a plurality of instructions stored thereon that in response to being executed cause a proxy computing node to:
  receive a data object request from a client computing device communicatively coupled to the proxy computing node, wherein the data object request identifies a requested data object to be retrieved by the proxy computing node;
  determine a subset of storage nodes from a set of storage nodes communicatively coupled to the proxy computing node, wherein each storage node of the subset of storage nodes contains a replication of the requested data object;
  obtain, for each of the subset of storage nodes that contains the replication of the requested data object, a service time that defines a first estimated amount of time to retrieve the requested data object from a corresponding storage node as a function of a total size of the requested data object, wherein to obtain the service time comprises to retrieve the service time from a table of service times, wherein each service time of the table of service times corresponds to an estimated amount of time to receive a data object of a particular range of size from a particular storage node of the subset of storage nodes, and wherein at least one estimated amount of time to receive a data object of a particular range of size from a particular storage node of the subset of storage nodes includes an estimated transit time from the particular storage node to the proxy computing node;
  obtain, for each of the subset of storage nodes that contains the replication of the requested data object, a wait time that defines a second estimated amount of time to complete tasks presently assigned to the corresponding storage node of the subset of storage nodes that contains the replication of the requested data object, wherein the wait time is to represent outstanding data object requests to the corresponding storage node of the subset of storage nodes that contains the replication of the requested data object;
  estimate, for each of the subset of storage nodes that contains the replication of the requested data object, an estimated completion time as a function of the wait time and the service time, wherein to estimate the estimated completion time comprises to compare the estimated completion time of each of the subset of storage nodes that contains the replication of the requested data object;
  determine, as a function of the estimated completion time, a target storage node from the subset of storage nodes that contains the replication of the requested data object to retrieve the requested data object from, wherein to determine the target storage node comprises selecting a storage node from the subset of storage nodes that contains the replication of the requested data object with a lowest estimated completion time; and
  transmit the data object request to the target storage node to retrieve the replication of the requested data object from the target storage node.

11. The one or more non-transitory, computer-readable storage media of claim 10, wherein the plurality of instructions further cause the proxy computing node to:
  start, prior to having transmitted the data object request, a timer of the proxy computing node;
  receive the requested data object;
  stop, subsequent to having received the requested data object, the timer;
  determine an updated service time based on a value of the timer;
  update the service time of the table of service times based on the updated service time; and
  update, subsequent to having updated the service time, the wait time of the target storage node based on a most recent wait time and the updated service time.

12. The one or more non-transitory, computer-readable storage media of claim 11, wherein to update the service time of the table of service times based on the updated service time further comprises to update the service time of the table of service times based on an exponentially weighted moving average.

13. The one or more non-transitory, computer-readable storage media of claim 10, wherein the plurality of instructions further cause the proxy computing node to determine the wait time as a function of a previously calculated wait time for a particular storage node of the subset of storage nodes and the obtained service time of the particular storage node.

14. The one or more non-transitory, computer-readable storage media of claim 10, wherein the plurality of instructions further cause the proxy computing node to update, subsequent to having transmitted the data object request, the wait time of the target storage node as a function of a most recent wait time and the service time.

15. The one or more non-transitory, computer-readable storage media of claim 10, wherein the plurality of instructions further cause the proxy computing node to:
generate a plurality of test data objects of different file sizes based on a plurality of predetermined data object size ranges;
transmit the test data objects to each of the storage nodes; and
generate a queue of a plurality of test data object requests, wherein each test data object request defines a different test data object to be retrieved by the proxy computing node from one of the storage nodes.

16. The one or more non-transitory, computer-readable storage media of claim 15, wherein the plurality of instructions further cause the proxy computing node to:
transmit a test data object request of the test data object requests of the queue;
receive the test data object corresponding to the test data object request;
determine a duration of time between having transmitted the test data object request and having received the test data object;
determine an updated estimated service time of the table of service times corresponding to the test data object request based on the duration of time; and
store the updated estimated service time at the table of service times in a corresponding entry based on a total size of the test data object,
wherein to estimate the estimated completion time comprises to estimate the estimated completion time as a function of the wait time and the updated estimated service time.

17. The one or more non-transitory, computer-readable storage media of claim 16, wherein to determine the duration of time between having transmitted and received the test data object comprises to (i) start a timer of the proxy computing node prior to having transmitted the test data object request, (ii) stop the timer subsequent to having received the test data object, and (iii) determine the duration of time as a function of a value of the timer.

18. A method for managing data object requests in a storage node cluster, the method comprising:
receiving, by a proxy computing node, a data object request from a client computing device communicatively coupled to the proxy computing node, wherein the data object request identifies a requested data object to be retrieved by the proxy computing node;
determining, by the proxy computing node, a subset of storage nodes from a set of storage nodes communicatively coupled to the proxy computing node, wherein each storage node of the subset of storage nodes contains a replication of the requested data object;
obtaining, by the proxy computing node and for each of the subset of storage nodes that contains the replication of the requested data object, a wait time and a service time, wherein the wait time defines a first estimated amount of time to complete tasks presently assigned to a corresponding storage node of the subset of storage nodes that contains the replication of the requested data object, wherein the wait time represents queued outstanding data object requests assigned to the corresponding storage node of the subset of storage nodes that contains the replication of the requested data object, wherein the service time defines a second estimated amount of time to retrieve the requested data object from the corresponding storage node as a function of a total size of the requested data object, wherein obtaining the service time comprises retrieving the service time from a table of service times, wherein each service time of the table of service times corresponds to an estimated amount of time to receive a data object of a particular range of size from a particular storage node of the subset of storage nodes, wherein at least one estimated amount of time to receive a data object of a particular range of size from a particular storage node of the subset of storage nodes includes an estimated transit time from the particular storage node to the proxy computing node;
estimating, by the proxy computing node and for each of the subset of storage nodes that contains the replication of the requested data object, an estimated completion time as a function of the wait time and the service time, wherein estimating the estimated completion time comprises comparing the estimated completion time of each of the subset of storage nodes that contains the replication of the requested data object;
determining, by the proxy computing node and as a function of the estimated completion time, a target storage node from the subset of storage nodes that contains the replication of the requested data object from which to retrieve the requested data object, wherein determining the target storage node comprises selecting a storage node from the subset of storage nodes that contains the replication of the requested data object with a lowest estimated completion time; and
transmitting, by the proxy computing node, the data object request to the target storage node to retrieve the replication of the requested data object from the target storage node.

19. The method of claim 18, further comprising:
starting, by the proxy computing node and prior to transmitting the data object request, a timer of the proxy computing node;
receiving, by the proxy computing node, the requested data object;
stopping, by the proxy computing node and subsequent to receiving the requested data object, the timer;
determining, by the proxy computing node, an updated service time based on a value of the timer; and
updating, by the proxy computing node, the service time at the table of service times based on the updated service time.

20. A proxy computing node for managing data object requests in a storage node cluster, the proxy computing node comprising:
means for receiving a data object request from a client computing device communicatively coupled to the proxy computing node, wherein the data object request identifies a requested data object to be retrieved by the proxy computing node;
means for determining a subset of storage nodes from a set of storage nodes communicatively coupled to the proxy computing node, wherein each storage node of the subset of storage nodes contains a replication of the requested data object;
means for obtaining, for each of the subset of storage nodes that contains the replication of the requested data object, a wait time and a service time, wherein the wait time defines a first estimated amount of time to complete tasks presently assigned to a corresponding storage node of the subset of storage nodes that contains the replication of the requested data object, wherein the wait time represents queued outstanding data object requests assigned to the corresponding storage node of the subset of storage nodes that contains the replication of the requested data object, wherein the service time defines a second estimated amount of time to retrieve the requested data object from the corresponding storage node as a function of a total size of the requested data object, wherein at least one estimated amount of time to retrieve the requested data object from the corresponding storage node includes an estimated transit time from the corresponding storage node to the proxy computing node;
means for estimating, for each of the subset of storage nodes that contains the replication of the requested data object, an estimated completion time as a function of the wait time and the service time, wherein to estimate the estimated completion time comprises to compare the estimated completion time of each of the subset of storage nodes that contains the replication of the requested data object;
means for determining, as a function of the estimated completion time, a target storage node from the subset of storage nodes that contains the replication of the requested data object from which to retrieve the requested data object, wherein to determine the target storage node comprises selecting a storage node from the subset of storage nodes that contains the replication of the requested data object with a lowest estimated completion time;
means for transmitting the data object request to the target storage node to retrieve the replication of the requested data object from the target storage node;
means for starting, prior to transmitting the data object request, a timer of the proxy computing node;
means for receiving the requested data object;
means for stopping, subsequent to receiving the requested data object, the timer;
means for determining an updated service time based on a value of the timer; and
means for updating the service time at a table of service times based on the updated service time, wherein each service time of the table of service times corresponds to an estimated amount of time to receive a data object of a particular range of size from a particular storage node of the subset of storage nodes.

\* \* \* \* \*